United States Patent [19]

Harrison et al.

[11] 4,341,016

[45] Jul. 27, 1982

[54] HAND TOOLS

[75] Inventors: Christopher R. B. Harrison, Porthcawl; Alan K. Pittaway, High Wycombe, both of England

[73] Assignee: Wilkinson Sword Limited, Buckinghamshire, England

[21] Appl. No.: 73,444

[22] Filed: Sep. 7, 1979

[30] Foreign Application Priority Data

Sep. 9, 1978 [GB] United Kingdom ............... 36250/78

[51] Int. Cl.³ ............................................. B26B 13/00
[52] U.S. Cl. ......................................... 30/262; 30/341
[58] Field of Search ................... 81/DIG. 9, 321, 322, 81/323; 30/261, 262, 271, 341, 260

[56] References Cited

U.S. PATENT DOCUMENTS 2,626,460  1/1953  Wahl .................................. 30/341 X

FOREIGN PATENT DOCUMENTS 1107556  5/1961  Fed. Rep. of Germany ........ 30/260
1102180  5/1955  France ................................... 30/271
 639386  6/1950  United Kingdom .................. 30/260

Primary Examiner—Jimmy C. Peters
Attorney, Agent, or Firm—Leydig, Voit, Osann, Mayer & Holt, Ltd.

[57] ABSTRACT

The hand tool comprises two members, for example male and female blade members in the case of a garden pruner, each formed with a tang portion which extends within a handle. For locking the members in a closed position a catch pin unit is fitted to one of the handles; the unit comprises a catch button secured slidably to a mounting plate by engagement with a spring plate on the opposite side of the mounting plate. The spring plate has resilient fingers which hold the spring plate releasably in selected positions. A catch pin which engages in the catch button is movable thereby along a slot in the associated member into and out of a recess in the other member to lock or release the members.

The members are releasably secured to the handles by a pivot bolt which passes through registering apertures in each member and associated handle. A recess in a said tang portion forms a seating for a stop cushion which extends to the surface of the handle through an opening in the handle above the recess.

8 Claims, 12 Drawing Figures

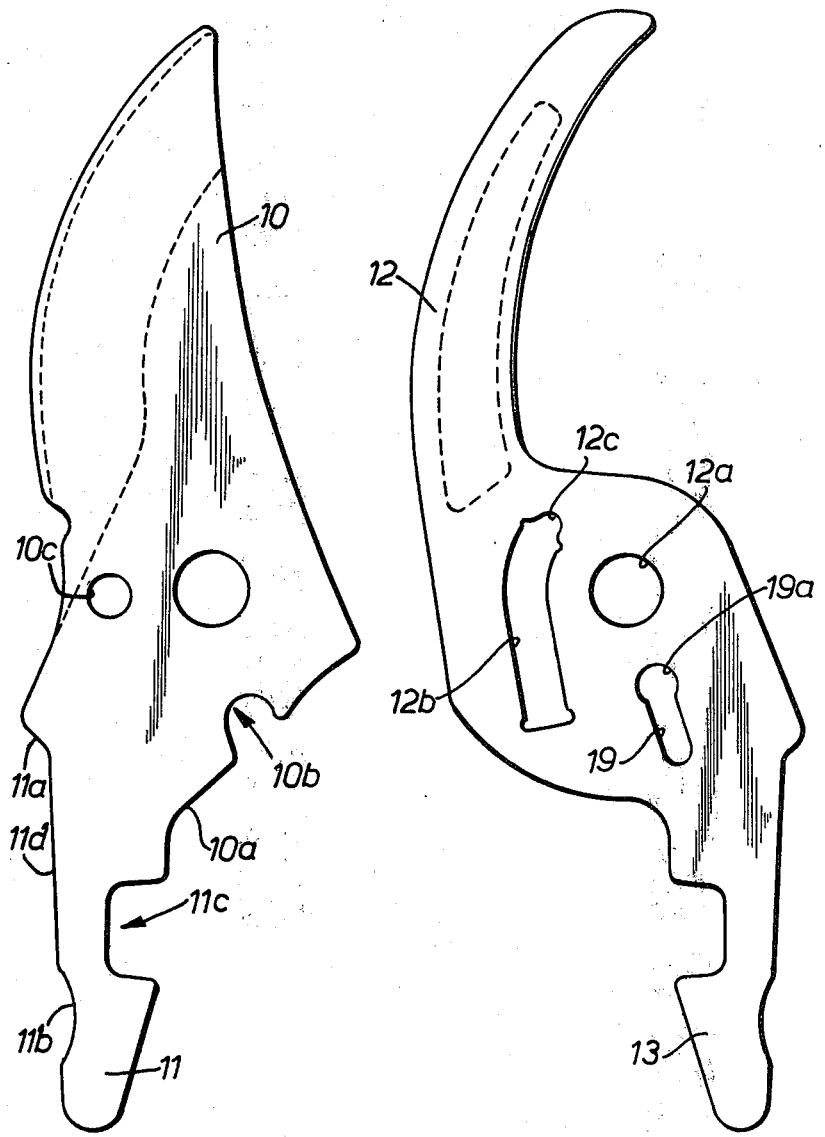

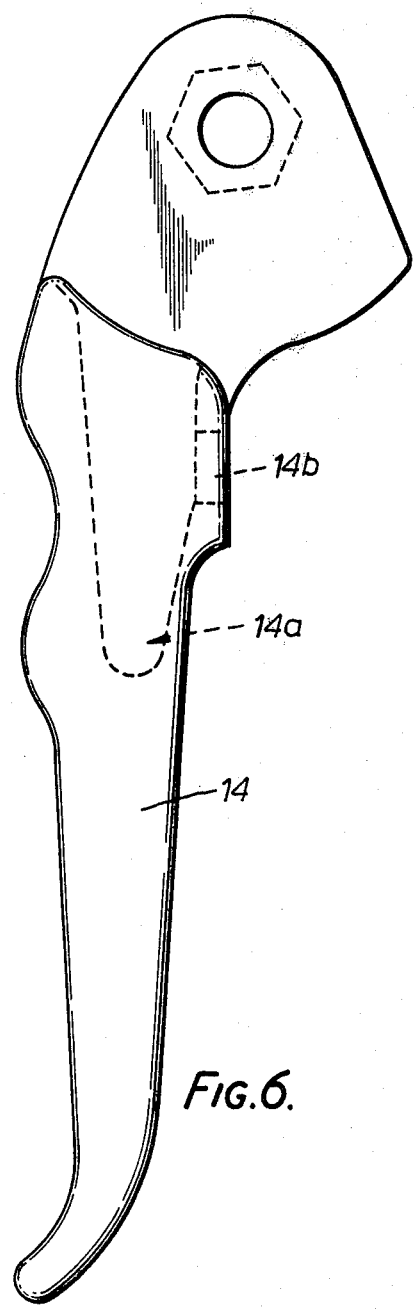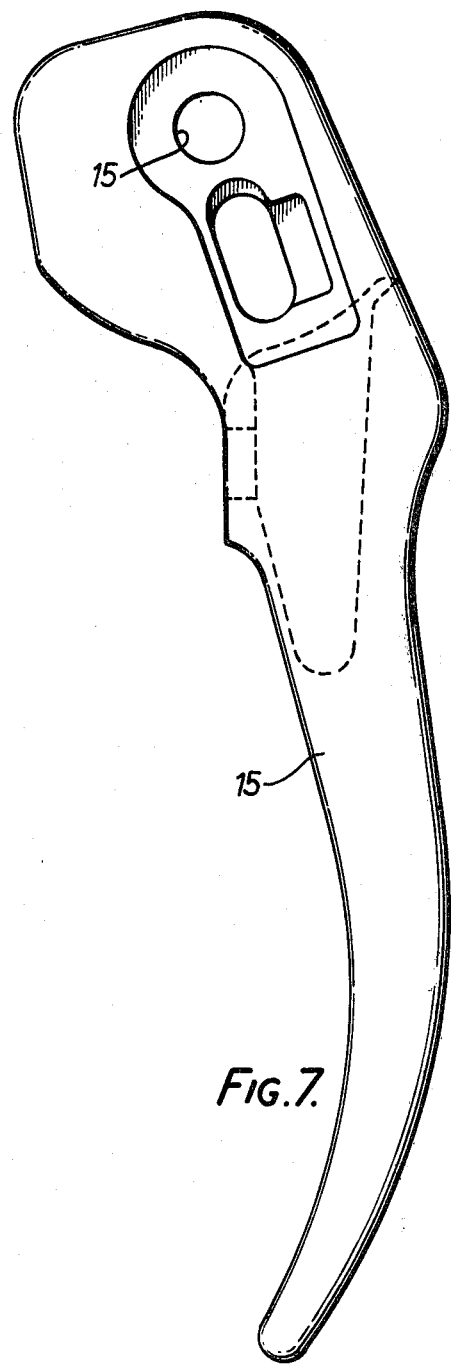

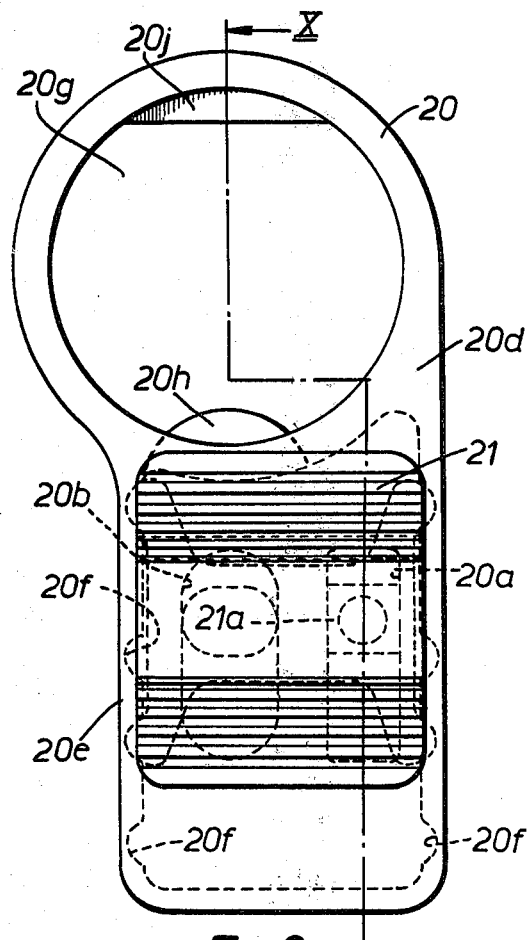
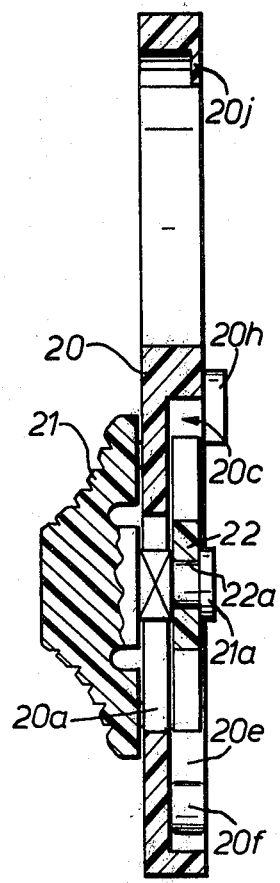
FIG.9.  FIG.10.
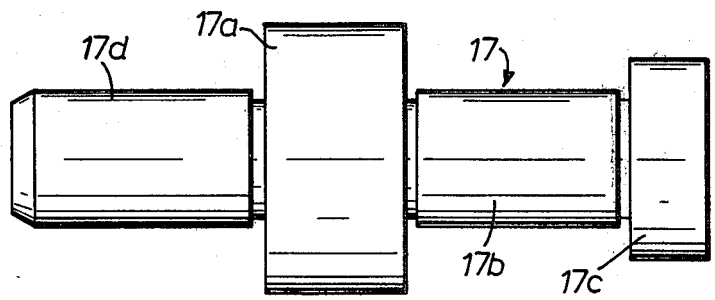
FIG.8.

HAND TOOLS

BACKGROUND OF THE INVENTION

This invention relates to hand tools comprising two co-operating members which are arranged to be moved relatively to one another by handles which are connected to the respective co-operating members. In particular the invention is applied to garden pruners and considerable research and development work is directed in this field to reducing manufacturing costs, and providing flexible designs which permit substantial variation of the finished product by the use of interchangeable parts.

BRIEF SUMMARY OF THE INVENTION

According to one aspect the present invention provides a hand tool comprising two co-operating members, two handles each secured to a separate one of said members, means interconnecting the members in mutually overlapping relationship to permit movement of the members relatively to one another by said handles, one said member having a slot therein, the other member having a recess therein, and a catch pin movable within said slot into engagement with said recess to lock the members together, characterised in that the catch pin forms part of a catch unit comprising a mounting plate having an elongate slot therein, a catch button slidable on one side of the mounting plate, a spring plate slidable on the mounting plate in sprung engagement therewith on the opposite side to the catch button, and means extending through said elongate slot and securing the catch button to said spring plate, said catch unit being mounted on said one member, and said catch pin being in permanent engagement with said catch button.

According to another aspect, the present invention provides a hand tool comprising two cooperating members, two handles each secured to a separate one of said members, means interconnecting the members in mutually overlapping relationship to permit movement of the members relatively to one another by said handles, each member including a tang portion and each handle being in the form of a sleeve which fits removably over the associated tang portion, each handle and the associated member having apertures therein which register with each other when said tang portion of the member is correctly inserted in the handle, each member being secured within its associated handle by a pivot bolt and nut assembly of which the bolt passes through said registering apertures.

BRIEF DESCRIPTION OF THE DRAWINGS

One example of a hand tool according to the invention, in the form of a garden pruner, is illustrated in the accompanying drawings in which:

FIG. 4 is a plan view of a male blade and integral tang of the pruner;
FIG. 5 is a plan view of a female blade and integral tang of the pruner;
FIGS. 6 and 7 are plan views of the two handles of the pruner;
FIG. 8 is a side elevation of a catch pin for locking the female and male blades in the closed position;
FIGS. 9, 10 and 11 are respectively a plan view, a sectional side elevation and sectional view on line XI—XI of FIG. 1, of a catch button assembly for operating the catch pin of FIG. 8, FIG. 11 showing the associated handle.

Figures 1, 2, 3:
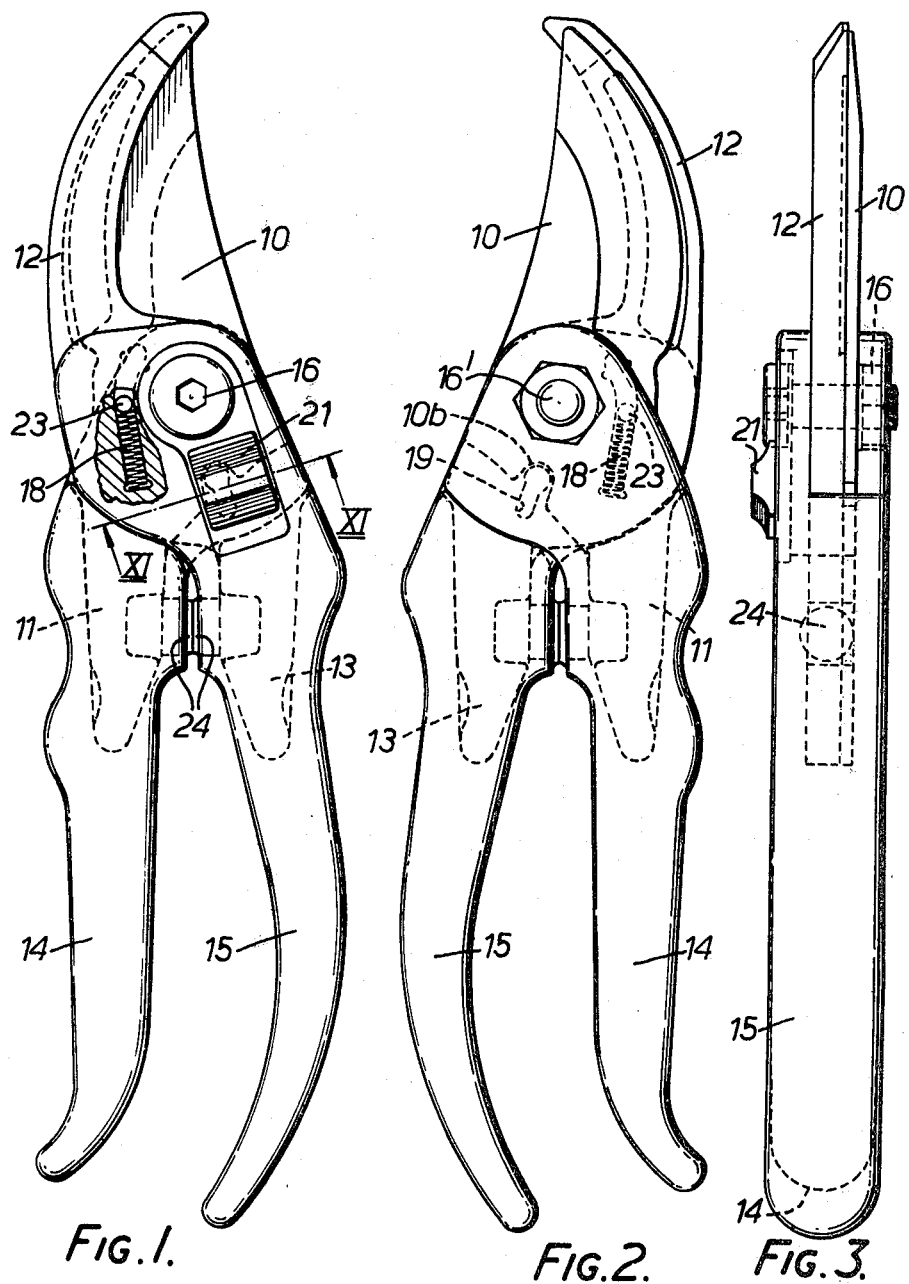
FIG. 1 is a plan view of the front of the pruner.
FIG. 2 is a plan view of the back of the pruner.
FIG. 3 is an elevation of one side of the pruner.
Figure 11:
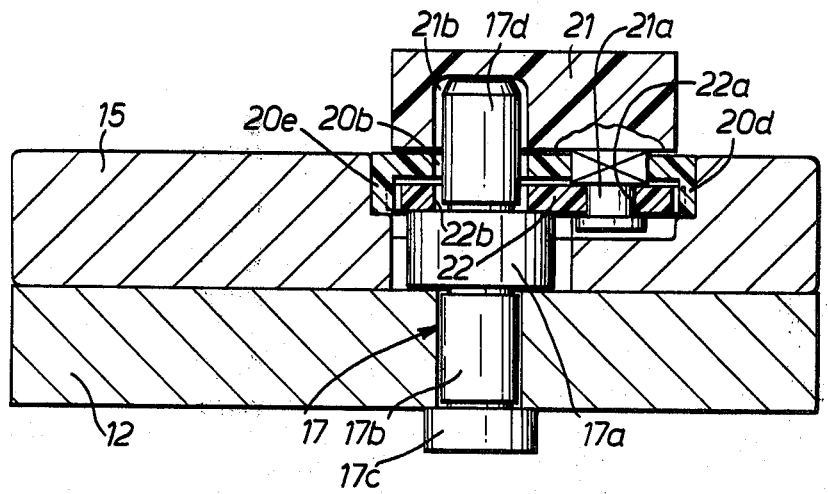
Figure 12:
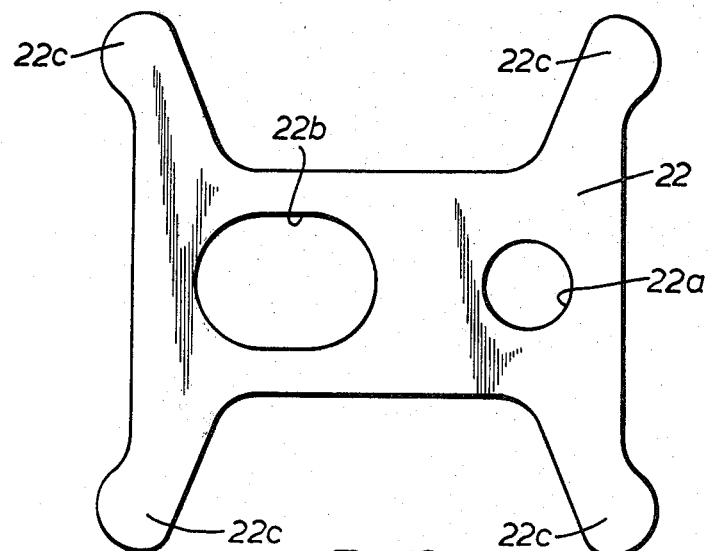
FIG. 12 is a plan view of a locating spring forming part of the catch button assembly of FIGS. 9 to 11.

The pruner shown in the drawings is of know construction insofar as it comprises a male blade 10 and integral tang 11, a female blade 12 and integral tang 13, handles 14 and 15 secured respectively to the tang 11, 13, a pivot bolt and nut assembly 16, 16' pivotally interconnecting the two blades in face to face relationship, a catch pin 17 mounted in the blade and handle assembly 12, 15 for engagement with the other blade and handle assembly 10, 14 to lock the blades together in the closed position, and a spring 18 for biasing blades to an open position. The pruners illustrated in the drawing differ however from existing pruners in a number of constructional details which will be discussed below.

Considering first the catch pin 17, it will be seen from FIG. 8 that this comprises a circular head portion 17a, a circular section shank portion 17b and a circular section foot portion 17c, the diameter of the foot portion being larger than that of the shank portion but smaller than that of the head portion, and a spigot portion 17d projecting axially from the head portion 17a. The length of the shank portion 17b will be equal to the thickness of the metal forming the female blade and tang assembly, plus clearance for sliding movement. The three portions of the catch pin will normally be turned from a single length of bar.

In assembly of the catch pin in the female blade, the catch pin 17 is inserted into a keyhole slot 19 (see FIG. 5) formed in the female blade and extending substantially radially with respect to a hole 12a in the blade for receiving the pivot bolt assembly. The width of the slot is such as to receive the shank portion 17b of the catch pin 17 in a sliding fit but the slot has an enlargement 19a, at its end nearest the pivot bolt hole 12a, of a size to allow the foot portion 17 of the catch pin to pass therethrough. The foot portion 17c is first inserted through the enlarged end 19a of the slot to locate the shank portion 17b within the slot, and the catch pin is then moved away from the enlarged end portion 19a so that the shank portion 17b forms a sliding fit in the slot. The male blade is so shaped as to provide a back edge 10a which, when the male blade has been assembled on the female blade, traverses the slot 19. This edge of the male blade contains a recess 10b into which the foot portion 17c of the catch pin can engage when the blades are in their closed position, in order to lock them in this position. In the locked position of the blades however, the foot portion 17c of the catch pin is spaced from the enlarged end portion 19a of the slot 19 (see FIG. 1) so that, after assembly, the catch pin remains locked within the slot and cannot be removed therefrom without disassembling the blades of the pruner. The edge 10a of the male blade is so shaped that, over the permitted range of movement of the blades, it does not interfere with the catch pin when the catch pin has been moved to the radially outer end of the slot 19. However, the back edge 10a of blade 10, at a point thereon on the side of recess 10b remote from tang 11, acts as a stop for the catch pin defining the maximum open position of the blades. If desired the recess 10b in the edge 10a can be stepped to provide a restricted range of opening for the blades. Preferably recess 10b is slightly undercut on one side, as shown, to form a safety lock, making it necessary to slightly close the pruners before the catch can be released.

The catch pin co-operates with a catch button assembly which is mounted in a recess on the front face of the pruners, i.e. on the handle 15 of the female blade, as seen in FIG. 1. This handle 15 is extended to overlap the whole of the area of the female blade which surrounds the pivot bolt assembly.

The catch button assembly (seen in FIGS. 9–12) comprises a decorative catch mounting plate 20 moulded in plastics material and formed with two elongate slots $20a$ and $20b$ extending in side by side relationship longitudinally of the handle, and a catch button 21 which is rectangular in plan view but roof shaped in sectional view for easy operation by the thumb of the user. The catch button has a spigot $21a$ extending downwardly from its underside, the initial portion of the spigot being of square cross section to fit slidingly within the slot $20a$ of the plate 20 and the remainder of the spigot being of circular section. The spigot is located to one side of the centre line of the button with respect to the direction of movement of the button. On the opposite side of the centre line, the button has a recess $21b$ in its underface overlapping the slot $20b$ in the plate 20, both the slot $20b$ and the recess $21b$ receiving therein a spigot $17d$ of the catch pin, which is upstanding from the head portion $17a$.

A further component of the catch assembly is a spring plate 22 (see FIG. 12) formed of plastics material and received in a recess $20c$ in the underside of the plate 20. The spring plate has an aperture $22a$ therein matching the shape of the circular end of the spigot $21a$ and in which the spigot will be welded in production of the assembly, and a second aperture $22b$ therein for receiving the end of the spigot $17d$ of te catch pin. At its four corners, the plate 22 is formed with spring fingers $22c$.

The mounting plate 20 has dependent flanges $20d$, $20e$ along its opposite longitudinal edges to define the recess $20c$ and to provide slide rails for engagement with the spring fingers $22c$. Each of these fingers is formed with two pairs of indentations $20f$ into which the spring fingers $22c$ of the plate 22 can engage to locate the catch button in either the closed position or the open position of the catch pin and hence of the blades.

If the male blade is formed with a stepped recess for receiving the catch pin, three pairs of indentations for receiving the spring fingers $22c$ can be provided to locate the catch pin selectively in three positions corresponding to the 'fully open', 'partially open', and 'closed' positions of the catch pin.

In fitting together the parts of the catch assembly, the catch button 21 is placed on top of the mounting plate 20 and the catch spring 22 fed in from the underside to engage in the recess $20c$ of the mounting plate. The four spring fingers $22c$ at the corners of the catch spring are located in one pair of indentations $20f$ in each of the flanges $20d$, $20e$, of the mounting plate. The spigot $21a$ on the catch button 21 passes through the mounting plate into the spring plate and is welded to it. It will thus be seen that as the catch button slides along the slot, the spring fingers ride out of one set of indentations $20f$ along the flanges of the mounting plate 20 to the next set of indentations. These indentations thus provide positive positional location for the catch. The provision of four location points means that despite the off centre application of the load to the catch pin, the whole assembly is stable. The spigot $21a$ of the catch button being welded to the spring plate 22 assists stability, preventing the catch button 21 from turning about the catch pin 17. The catch pin passes through the catch spring and into the button, the pin having close clearance through the spring and an interference fit in the button in the plane of its movement. The catch button locating recess $21b$ for the catch pin is slotted at right angles to the movement of the button so that the effect of tolerances on the assembly with respect to the catch are catered for in this direction.

The head of pivot bolt 16 is received in an aperture $20g$ in the plate 20 and overlies a D washer (not shown) which in turn overlies a web $20h$ of the plate 20 to assist in securing the catch unit within handle 15. The D washer provides a rubbing surface to protect the handle from movement of the bolt head. A web $20j$ prevents movement of the washer relative to the handle.

In the pruner illustrated in FIG. 1, it will be seen that the spring 18 for urging the blades apart is a helical spring located in a slot $12b$ formed in the female blade, the slot, over its length traversed by the movable end of the spring, being arcuate about the axis of the pivot bolt assembly, whereas the remainder is straight to reduce spring friction. A pin 23 fitted into an aperture $10c$ in the male blade extends into the arcuate portion of the slot and is located at the closed end of the arcuate portion of the slot when the blades are in the open position. As the blades are rotated from the open position towards the closed position, the pin 23 moves along the slot compressing the helical spring 18 and creating a biassing force tending to open the blades. Since the helical spring must be inserted into the slot under load, a shoulder $12c$ is formed at a position spaced from the closed end of the arcuate portion against which the spring can abut in its extended state to hold the spring away from the end of the slot $12b$ and thereby facilitate insertion of the pin into the slot during assembly of the pruner.

Considering now the blade, tang and handle assemblies with reference first to FIGS. 4 and 5, it will be seen that the tangs 11 and 13 are of similar shape and construction and therefore only one of them need be discussed. Considering tang 11 on male blade 10, it will be seen that a shoulder $11a$ is formed on the forward edge of the tang, i.e. on the edge which forms a continuation of the blade cutting edge, and a recess $11b$ is formed on the same edge adjacent its tip. On the rearward edge of the tang there is a rectangular shaped cut-out $11c$ located in a portion of the tang intermediate the shoulder $11a$ and recess $11b$.

These configurations of the tang facilitate fitting of various handles to the tang. Thus the handle can be a diecasting fitted removably to the tang and secured to the tang by the bolt 16 which passes through apertures such as $12a$ and $15a$ in the member 12 and handle 15. These apertures register with one another when the tang 13 is correctly inserted in the handle 15. The flat surface $11d$ between shoulder $11a$ and recess $11b$, and continuing for a short distance on the opposite side of recess $11b$, provides a location surface for the handle. The recess $14a$ (see FIG. 6) in the handle for receiving the tang 11 will also open to the surface of the handle in the vicinity of the recess $11c$ of the tang to provide an opening $14b$ to receive a cushion stop 24 which will then seat in the recess $11c$ and on the edge of the diecasting. Thus the impact on the cushion stops will be carried both by the tangs and by the diecast handles.

As an alternative, the handle can be moulded onto the tang in plastics material, and in this event the plastics material will flow into the recess $11b$ to key the handle to the tang. The mould in which the handle is formed is such as to leave an aperture in the handle opposite the cut-out 11c (see FIG. 6) but with a portion of the handle projecting from the base of the cut-out 11c to form a spigot on which the cushion stop can be located. If desired, a single cushion stop can be provided on one handle only, the other handle being plain.

What we claim is:

1. A hand tool comprising two cooperating members, two handles each secured to a separate one of said members, means interconnecting the members in mutually overlapping relationship to permit movement of the members relatively to one another by said handles, one said member having a slot therein, the other member having a recess therein, and a catch pin movable within said slot into engagement with said recess to lock the members together, characterised in that the catch pin forms part of a catch unit comprising a mounting plate having an elongate slot therein, a catch button slidable on one side of the mounting plate, a spring plate slidable on the mounting plate in sprung engagement therewith on the opposite side to the catch button, and means extending through said elongate slot and securing the catch button to said spring plate, said catch unit being mounted on said one member, and said catch pin being in permanent engagement with said catch button.

2. A hand tool according to claim 1 wherein said one member has a recess in a surface thereof within which said catch unit is housed.

3. A hand tool according to claim 1 in which said spring plate has spring fingers projecting from said plate and said mounting plate has a plurality of recesses into which said spring fingers can engage to resiliently hold said catch button at selected positions of the catch button along the mounting plate.

4. A hand tool according to claim 1 wherein the catch pin had a head portion, a foot portion and a shank portion interconnecting head portion and foot portion, the shank portion being of a size to fit slidingly with said slot in said one member and the foot portion being of a size to fit through an enlarged portion of the slot at one end thereof prior to fitting of the said members together, the overlap of said members of assembled tool preventing movement of the catch pin into the enlarged portion of the slot.

5. A hand tool according to claim 4 wherein the catch pin has a spigot extending from said head portion and said catch button has a recess into which said spigot engages.

6. A hand tool according to claim 1 wherein the means interconnecting the members comprise a bolt, the mounting plate having an opening therein through which the bolt extends to assist in securing the catch unit to said one member.

7. A hand tool according to claim 1 wherein each member includes a tang portion and each handle is in the form of a sleeve which fits removably over the associated tang portion, each handle and the associated member having apertures therein which register with each other when said tang portion of the member is correctly inserted in the handle, each member being secured within its associated handle by a pivot bolt and nut assembly which form said interconnecting means and of which the bolt passes through said registering apertures.

8. A hand tool according to claim 7 wherein at least one said tang portion has a recess therein, and the associated handle has an opening therein disposed opposite the recess of said tang portion when the tang portion is correctly positioned within the handle, and a cushion stop fitted within said opening in the handle, the inner end of the cushion stop being received within the recess of the tang portion and supported by said tang portion.

* * * * *